May 29, 1945.　　T. BROWN ET AL　　2,377,127
POWER LIFT FOR FARM TRACTORS
Filed Jan. 19, 1942　　4 Sheets-Sheet 1

INVENTORS
THEOPHILUS BROWN
TALBERT W. PAUL
ATTORNEY

May 29, 1945.                T. BROWN ET AL                  2,377,127
                        POWER LIFT FOR FARM TRACTORS
                          Filed Jan. 19, 1942            4 Sheets-Sheet 2
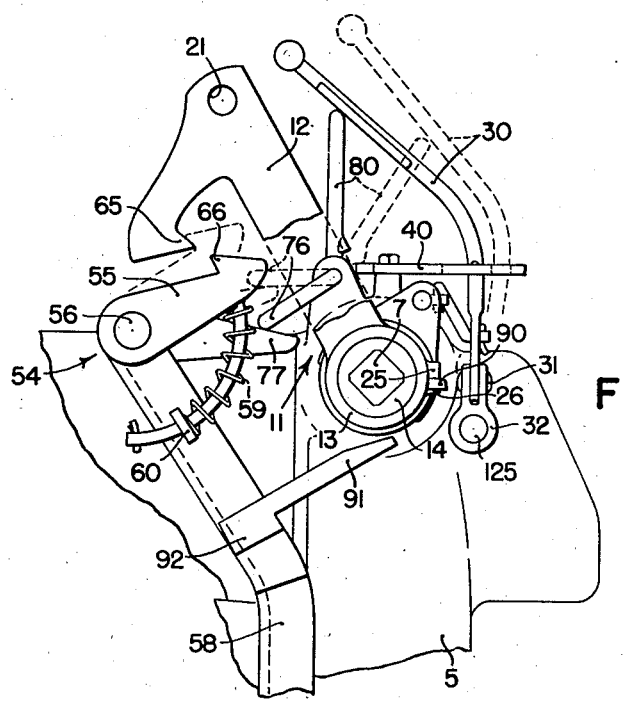
FIG. 2
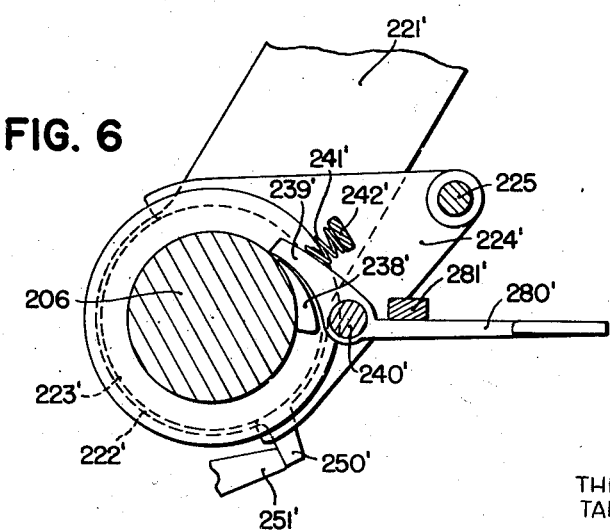
FIG. 6
INVENTORS
THEOPHILUS BROWN
TALBERT W. PAUL
BY 
ATTORNEY May 29, 1945.　　　T. BROWN ET AL　　　2,377,127
POWER LIFT FOR FARM TRACTORS
Filed Jan. 19, 1942　　　4 Sheets-Sheet 3

INVENTORS
THEOPHILUS BROWN
TALBERT W. PAUL
BY
ATTORNEY

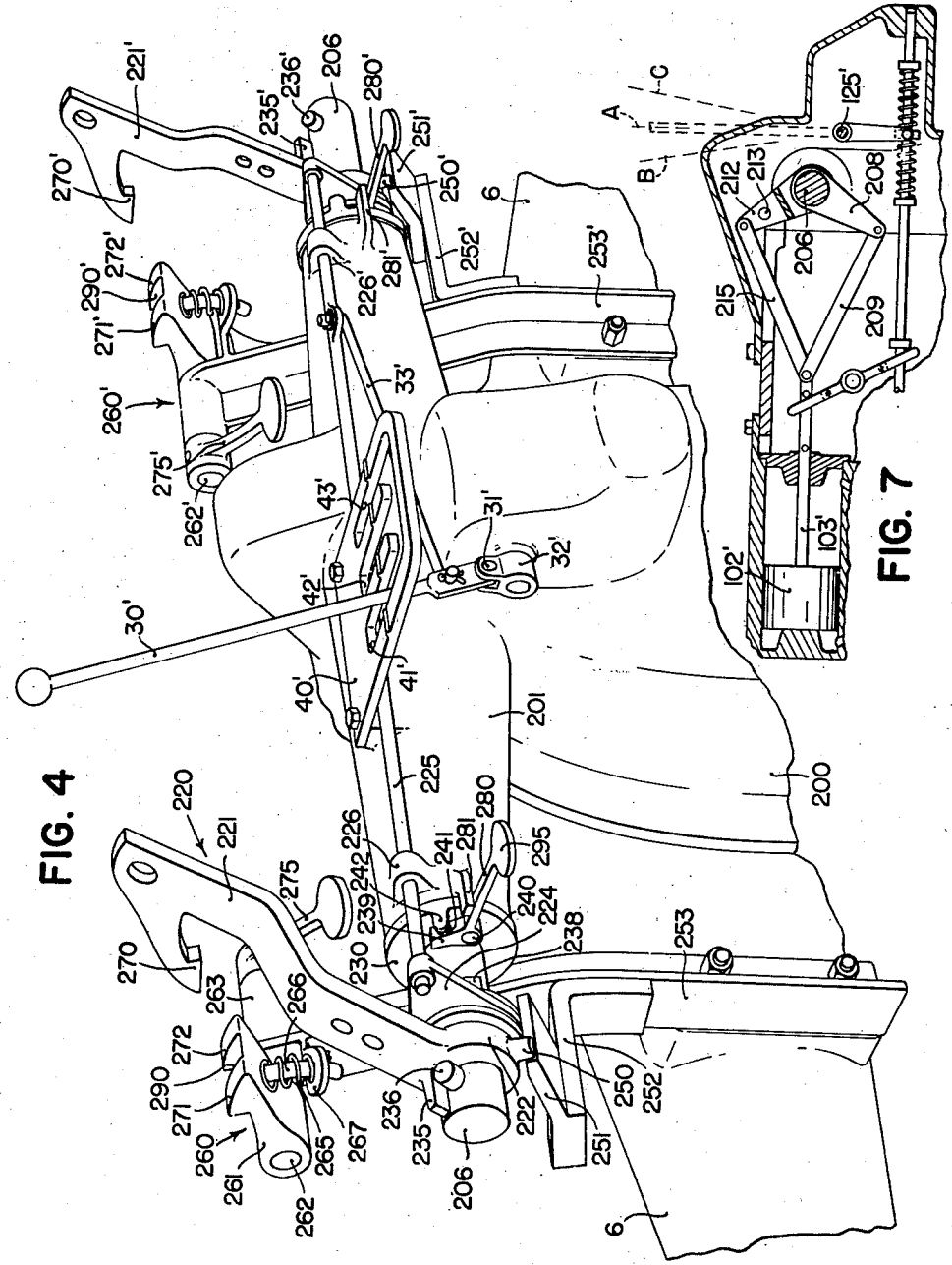

Patented May 29, 1945

2,377,127

UNITED STATES PATENT OFFICE 2,377,127

POWER LIFT FOR FARM TRACTORS

Theophilus Brown and Talbert W. Paul, Moline, Ill., assignors to Deere & Company, Moline, Ill., a corporation of Illinois Application January 19, 1942, Serial No. 427,320

30 Claims. (Cl. 192—48)

The present invention relates to power lift devices of the type commonly used on agricultural tractors for raising and lowering implements associated therewith, and has as it principal object the provision of a new and improved power lift capable of raising and lowering a number of implement rigs one after the other or simultaneously, at option.

During certain tilling operations, as when cultivating pointed rows with a cultivator which operates on several rows at the same time, it is often desirable to raise the rigs on one side of the tractor before raising those on the other side, or to raise the rigs mounted on the front end of the tractor before raising those on the rear end. Likewise, it is often desirable to lower the rigs one after another when starting to cultivate a number of pointed rows, while at other times it may be advantageous to raise or lower all of the rigs simultaneously.

Several arrangements for accomplishing this result have been previously proposed, such being shown in the Brown Patent 2,195,610, issued April 2, 1940, wherein a series of individually controlled power lift clutches are employed, and in the Brown patent application Serial No. 334,831, filed May 13, 1940, now Patent No. 2,269,515, wherein a single full revolution, self-interrupting clutch is employed with an arrangement of separate control levers for effecting the several definite operations desired, are utilized. The present invention is in the nature of an improvement over the above referred to prior devices.

Accordingly another object of our invention is to provide a power lift device wherein means are provided for conditioning the mechanism to determine the sequence in which separate lifting members wil be operated upon subsequent operation of the power lift unit.

Another object of our invention is to provide a power lift device in which the operation of the power lift unit and the conditioning of the lifting connections to determine the sequence of operation of the lifting members is controlled through a single control member.

Another object of our invention is to provide a power lift device in which a single control member is provided having different movements, one movement controlling the lifting connections to determine the sequence of operation of the lifting members, and another movement controlling the operation of the power lift unit.

Another object of our invention is to provide a power lift device in which the lifting members are locked hydraulically when they are moved to raised position simultaneously and are separately mechanically locked in raised position when they are moved to raised position successively.

Another object of our invention is to provide a power lift device in which a rockshaft is oscillated through power applied thereto by a hydraulic power lift unit and upon which lifting members are journaled and to which they may be alternately or simultaneously locked through clutches actuated by the valve control member through which the operation of the hydraulic unit is controlled.

Another object of our invention is to provide a power lift device including a power member having two separate lifting movements with lifting members associated therewith through connections whereby one of said lifting members is actuated by one of the movements of said power member and the other lifting member is actuated by the other movement of said power member. A further object is to provide in such a power lift device a control arrangement for causing either of the two lifting members to be operated by either movement of the power member.

A further object of our invention is to provide a power lift device having lifting members which may be operated successively or simultaneously and in which a locking arrangement is provided for mechanically locking the lifting members in position when the latter are operated successively and in which the locking members are ineffective when the lifting members are operated simultaneously.

These and other objects and advantages of the present invention will become apparent to those skilled in the art after consideration of the following detailed description of preferred embodiments thereof, reference being had to the accompanying drawings, in which Fig. 1 is a perspective view, as seen from the rear, of one form of power lift device embodying the principles of our invention;

Fig. 2 is a side view of the same, as seen from the left side;

Figure 5:
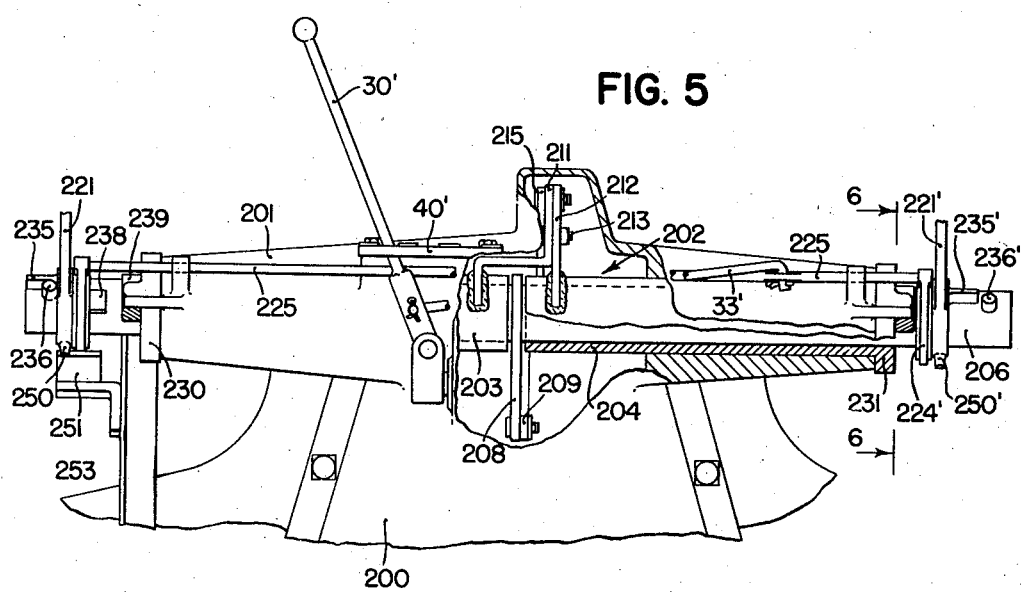

Figs. 4 to 7 disclose another form of a power lift device embodying the principles of our invention, Fig. 4 being a perspective view as seen from the rear;

Fig. 5 is a rear elevation partly shown in section;

Fig. 6 is a cross-sectional view along the line 6—6 of Fig. 5, and

Fig. 7 is a fragmentary vertical cross-sectional view of the lifting connections for the power lift unit of this embodiment.

Figure 1:
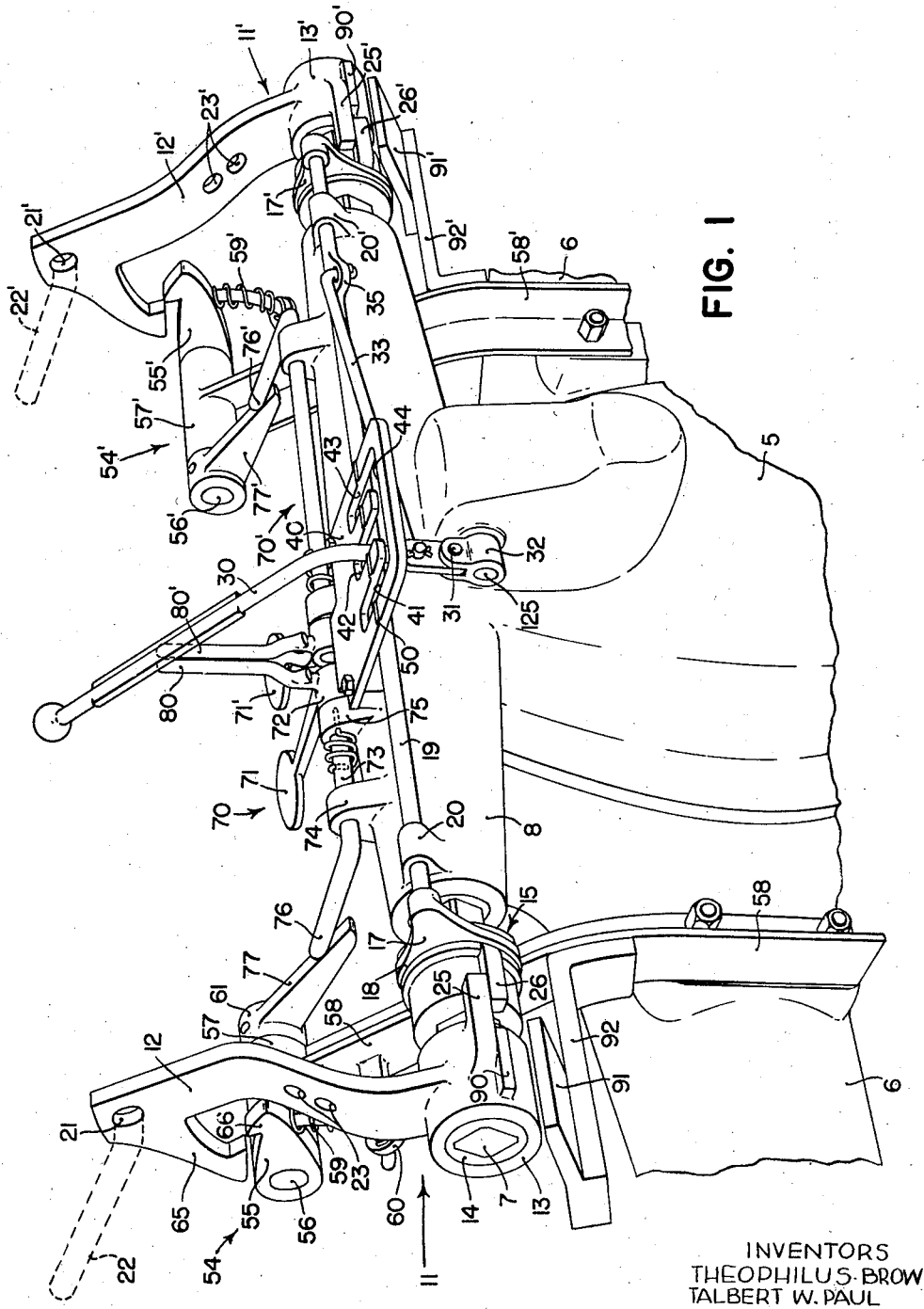
Figure 3:
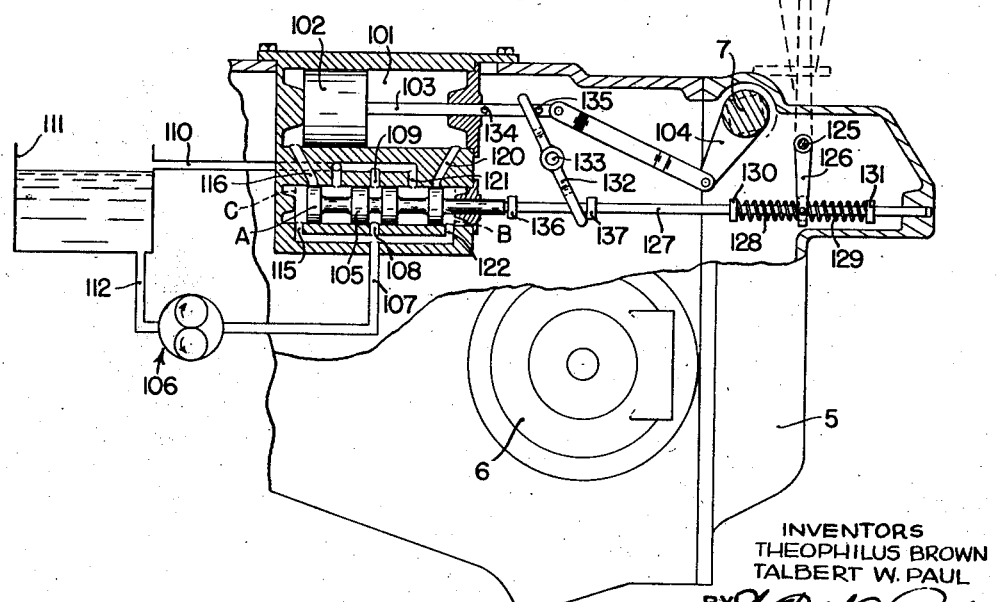
Fig. 3 is a fragmentary vertical cross-sectional view of the power lift unit and of its lifting and control connections.

Referring now to Figs. 1 to 3, the power lift device therein shown is mounted upon a housing frame 5 which may be fixed to the rear end of a tractor, for example, over the rear opening of the rear axle structure thereof, represented at 6, 6. A power member in the form of a lifting rockshaft 7 extends through and is journaled in a sleeve 8 formed as an integral part of the housing 5. Rockshaft 7 is oscillated back and forth through an angle of about 60 degrees by a power lift unit, preferably in the form of a hydraulic mechanism mounted within the tractor housing and comprising a hydraulic cylinder 101 in which is disposed a piston 102 having a connecting rod 103 link connected to an arm 104 fixed to the rockshaft 7. Movements of the piston are controlled by a sliding valve 105, which controls the flow of fluid to the ends of the cylinder from a pump shown diagrammatically at 106. Valve 105 is so arranged that when it is in its central position A, see Fig. 3, fluid from the pump 106 is merely by-passed from the high pressure line 107 through ports 108 and 109 into the low pressure line 110 to the fluid reservoir 111, having connection with the intake line 112 of the pump 106; when valve 105 is moved into position B, fluid under pressure is directed through ports 115 and 116 into the left side of cylinder 101 to move piston 102 rearwardly, and cause counter-clockwise rotation of rockshaft 7. The fluid in the opposite side of cylinder 101 is conducted through ports 120 and 121 into the low pressure line 110. When valve 105 is moved into position C, fluid under pressure is directed through ports 122 and 120 into the right side of cylinder 101 to move the piston 102 forwardly and cause clockwise rotation of rockshaft 7.

The movements of valve 102 are controlled by control shaft 125 journaled in housing 5. An arm 126 fixed on shaft 125 has a forked end embracing the extended end of the valve stem 127. A pair of compression springs 128 and 129 are disposed on opposite sides of arm 127 and abut collars 130 and 131 fixed on stem 127. Rocking shaft 125 in opposite directions from a neutral position moves valve 105 into its operating positions B and C.

A rocker arm 132 pivoted at 133 has its ends forked to embrace connecting rod 103 and valve stem 127. A pair of spaced stops 134 and 135 on rod 103 are positioned to contact the upper end of arm 132, and another pair of spaced stops 136 and 137 are provided on stem 127 to be contacted by the lower end of arm 132 to return the valve to its neutral position, in the event the operator does not do so before the piston 102 reaches the end of its stroke in either direction. Since the invention is not especially concerned with the particular hydraulic mechanism employed for rocking the rockshaft 7 from one limiting position to the other, responsive to the movements of the valve control shaft 9, it is deemed unessential to describe the latter in greater detail. Reference may be had to the Harold Brown Patent 1,929,804 for a more detailed description of a similar power lift unit.

Separate lifting devices 11 and 11' are mounted on opposite ends of rockshaft 7. The device 11 mounted on the left end, looking at Fig. 1, comprises a lifting or actuating member in the form of an arm 12 formed integral with hub 13, which is journaled on the outer cylindrical periphery of a bushing 14 fitted over the squared end of rockshaft 7. The exposed portion of shaft 7 on both ends is of square cross-section. Between the hub 13 and the end of the housing 8, a clutch member 15 is slidably mounted on the rockshaft 7. Clutch member 15 is slidable to any one of three positions by means of a fork 17 disposed in a recess 18 formed around the periphery of clutch member 15. Fork 17 is fixed to the outer end of a controlling rod 19 slidably disposed in bearing lugs 20 and 20' formed on the ends of sleeve 8.

A lug 25 is formed on hub 13 and extends axially thereof towards the clutch member 15, and a companion lug member 26 is formed on the clutch member 15 and is positioned to contact lug 25 in certain positions of the clutch member 15, as will be described later, and thereupon causes movement of the arm 12 upon the oscillation of the rockshaft 7 in a counter-clockwise direction.

The lifting device 11' mounted on the right end of rockshaft 7 is similar to lifting device 11, and corresponding parts have been numbered the same with the prime designation added. Both arms 12 and 12' are provided with holes 21 and 21' in the outer ends for making connection with lifting rods 22 and 22' of a cultivator, for example, mounted on the forward end of the tractor. Other holes 23 and 23' are provided for connecting rearwardly extending arms 12 and 12' for making lifting connections to implements at the rear of the tractor. It is to be noted that the clutch collar 17' is mounted on the opposite end of control rod 19. Consequently, when the control rod 19 is moved in one direction, one clutch member is moved outwardly and the other is moved inwardly.

As previously described, the rocking of the rockshaft 7 is controlled by control shaft 125. This is effected through the agency of a hand-operated lever 30 which is pivoted at 31 upon a collar 32 fixed upon the control shaft 125. The axis of the pivot 31 extends transversely of the control rod 19. A link 33 is pivotally connected to the lever 30 and to a lug 35 formed integral with rod 19. Consequently, a rocking movement of the lever in a transverse plane, i. e. in the direction longitudinally of the control rod 19, causes the latter to shift the clutch members 15, 15', whereas rocking lever 30 fore-and-aft, i. e. in a plane perpendicular to the control rod 19, actuates the valve rod 127 and hence the hydraulic mechanism, and thus causes oscillation of the rockshaft 7.

The movements of lever 30 are restricted by a guide plate 40 mounted upon the top of sleeve 8. Guide plate 40 is provided with three longitudinally extending slots 41, 42, 43, which are connected at the rear by a transversely disposed slot 44. Slots 41, 42 and 43 are so spaced with respect to lugs 25 and 26, and 25' and 26' that when lever 30 is disposed in slot 41, lug 25 extends over the path of lug 26, but lug 25' extends short of the path of lug 26'; when lever 30 is disposed in the center slot 42, both lugs 25 and 25' extend into the paths of lugs 26 and 26', and when lever 30 is disposed in slot 43, lug 25' extends over the path of lug 26', but lug 25 extends short of the path of lug 26. Thus, when lever 30 is moved into the forward end of slot 41, causing a movement of valve 105 into position B, the lifting unit operates to cause counter-clockwise rotation of rockshaft 7, and lifting movement is transmitted to lifting arm 12, but no lifting movement is transmitted to lifting arm 12'. When lever 30 is moved into the forward end of slot 42, lifting movement is transmitted to both lifting arms 12 and 12' in response to counter-clockwise rocking of rockshaft 7. When lever 30 is moved into the forward end of slot 43, lifting motion is transmitted to lifting arm 12', but no lifting motion is transmitted to lifting arm 12.

Slots 41, 42 and 43 are of such length and so positioned that when lever 30 is in the middle position in either slot, as indicated by the raised bars 50 on guide plate 40, the valve 105 is in a neutral position, in which position the rockshaft 7 is locked in whatever position it was moved to previously. When the lever 30 is moved to the rear end of slots 41, 42 and 43, i. e. into the transverse slot 44, valve 105 is moved to position C, causing a clockwise rotation of rockshaft 7.

In order that either lifting arm 12, 12' may be held in a lifted position while the other lifting arm is in a lowered position or is being raised, a separate lockup device is provided for each lifting arm. The lockup device 54 for lifting arm 12 comprises a latch arm 55 fixed to a stud 56 journaled in a bearing 57 fixed on the upper end of a standard 58 connected to the rear axle housing of the tractor. Latch arm 55 is yieldingly held in the position shown in Fig. 1 by means of a compression spring 59 disposed between latch arm 55 and a lug 60 extending laterally from standard 58. The latch arm 55 and the stud 56 are held in position by means of a collar 61 fixed to the inner end of stud 56 extending through bearing 57. Lifting arm 12 is provided with a latch hook 65 in position to ride over and engage in back of the latch 66 on latch arm 55 just prior to lifting arm 12 being raised to its full raised position. Thus, when lifting arm 12 is lifted to its full raised position, it will be locked in such position independently of the position of rockshaft 7.

A similar locking device 54' has been provided for lifting arm 12' and corresponding parts have been given the same reference numerals with prime designation added.

In the operation of the mechanism thus far described the two lifting arms 12 and 12' may be operated to a raised position successively in the following manner. Assuming the lifting arm 12 is to be operated first and thereafter the lifting arm 12', lever 30 is moved into the slot 41 and to the forward end thereof. This rocks lifting member 12 into its raised position as was heretofore described, and the latter is locked in that position by lockup device 54. Lever 30 is then moved back into the rear end of slot 41 and held there momentarily during which time rockshaft 7 is caused to rock in a clockwise direction to the lowered position. Lever 30 is then shifted laterally opposite slot 43. The lug 26' on clutch 15' is thereby moved into the path of lug 25' and thereafter lever 30 is moved to the forward end of slot 43. Again, rockshaft 7 is rocked counter-clockwise. Now lifting arm 12' is moved to raised position and locked in such position by the lockup device 54'. Had the operator wished to first move lifting arm 12' to a raised position and thereafter lifting arm 12, he would have first operated lever 30 in slot 43 and then in slot 41.

If the piston 102 reaches the end of its return stroke and, as a consequence, valve 105 has been moved to its neutral position A by arm 132 and stop 135 before the operator has moved lever 30 opposite the slot in which he next desires to operate it, spring 128 will be compressed. Spring 128, however, is of sufficient length that lever 30 may be held in slot 44 and moved therein against the pressure of the spring.

In order that the operator may release either lifting arm 12 or 12', at will, a release device has been provided for each lockup device. Releasing device 70 comprises a foot pedal 71 which extends forwardly and laterally from a hub 72 fixed to the inner end of a rockshaft 73 journaled in bearing openings in lugs 74 and 75 on sleeve 8. The outer end of rockshaft 73 beyond the bearing 74 is bent forwardly to form a cam 76. Cam 76 is positioned to bear upon the upper surface of an arm 77 formed integral with hub 61. Latch release mechanism 70' for lockup device 54' is similar to that just described and corresponding parts have been given the same reference numbers with prime designation added. By stepping on pedal 71, a clockwise rotation of arm 55 and a disengagement thereof from latch hook 65 is effected, whereupon lifting arm 12 is free to rotate to a lowered position by the weight of the implement attached to it. Similarly, stepping on treadle 71' disables lockup device 54' and permits lifting arm 12' to move to a lowered position under the weight of the implement attached to it.

In order that the operator may be able to lift and then lower both lifting arms 12 and 12' simultaneously without having to actuate both foot pedals 71 and 71', means have been provided for disabling both lockup devices 54 and 54', whenever the lever 30 is actuated in the center slot 42. Upwardly extending arms 80 and 80' are provided on hubs 72 and 72', respectively. The upper ends 81 and 81' of these arms are adapted to be contacted by lever 30 whenever the latter is disposed opposite slot 42. The first movement of lever 30 into slot 42 actuates release device 70 and 70', to disable both lockup devices 54 and 54'. Arms 80 and 80' are sufficiently close together so as not to be engaged by lever 30 when the latter operates in either slot 41 or 43. When the lever 30 is moved forwardly in slot 42, both lifting arms 12 and 12' are raised to a lifted position but are not locked up by lockup devices 54 and 54', as these are then disabled. At such time, both arms are held up through the fluid locked in the forward end of cylinder 101. This is the position in which the mechanism is shown in Fig. 1. When lever 30 is moved back to the rear end of slot 42, piston 102 is moved into the forward end of cylinder 101 and both lifting arms 12 and 12' are rotated rearwardly to lower both the implements connected therewith.

In order to prevent lifting arm 12 from rocking back beyond a full lowered position, a stop lug 90 is provided on hub 13, which is adapted to be contacted by a stop 91 provided on a laterally extending arm 92 fixed to standard 58. A similar stop lug 90' is provided for lifting arm 12', such lug cooperating with a stop 91' provided on laterally extending arm 92' fixed to standard 58'.

Referring now to Figs. 4 to 7 in which another embodiment of my invention is disclosed. The power lift device thereof is mounted in a housing frame 200 having a bearing 201 formed integrally therewith. In the power lift device of this embodiment, two separate lifting members are provided, one being in the form of a sleeve member 202 comprising a pair of sleeves 203 and 204 journaled in opposite end portions of bearing sleeve 201, and the other being in the form of a rockshaft 206 journaled in sleeves 203 and 204. The outer ends of sleeves 203 and 204 are provided with flanges 230 and 231, respectively, which abut the ends of sleeve 202. Rockshaft 206 projects outwardly beyond the flanges 230 and 231.

Rockshaft 206 and sleeve member 202 are oscillated in opposite directions through separate connections to the piston rod 103' of a power lift unit which may be the same as that shown in Fig. 3. Corresponding parts thereof have been given the same reference numerals with the prime designation added. These connections are best shown in Fig. 7. Rockshaft 206 is provided with a depending arm 208 fixed to the center thereof, the lower end of which is connected by means of a link 209 with piston rod 103'. The inner ends of sleeves 203 and 204 are provided with upwardly extending arms 211 and 212 fixed together by means of a bolt 213 to cause the sleeve member 202 consisting of sleeves 203 and 204 to rotate as a single unit. See Fig. 5. The upper ends of arms 211 and 212 are link connected by means of a link 215 to piston rod 103'. Consequently when the piston rod 103' is moved to the right as viewed in Figure 7, responsive to a counter-clockwise rotation of the valve control shaft 125', rockshaft 206 is rotated in a counter-clockwise direction and sleeve member 202 is rotated in a clockwise direction. Conversely, when piston rod 103' is moved toward the left, rockshaft 206 is rotated in a clockwise direction and sleeve member 202 is rotated in a counter-clockwise direction.

In this embodiment, two separate lifting devices 220 and 220' are also provided. Lifting device 220 comprises a lifting arm 221 formed integral with a hub 222 which is journaled on the extended left end of rockshaft 206. The inner side of hub 222 is provided with a peripheral groove in which is slidably disposed a fork member 224 connected to a sliding rod 225 journaled in lugs 226 and 226' formed on the ends of bearing sleeve 201. This slidable connection between the fork 224 and the groove in the hub 222 is similar to the arrangement of the fork 224' in the groove 223' in a hub 222' on arm 221' at the opposite end of the rockshaft 206, as shown in Figure 6. Under the control of rod 225, hub 222 may be disposed in any of three positions on shaft 206, as will be described more in detail later.

Fixed on the outer face of hub 222 is an outwardly extending lug 235. A companion lug 236 extends radially from shaft 206 and is positioned to contact lug 235 in two of the positions in which hub 222 may be positioned. Another lug 238 extends inwardly from the inner face of hub 222 and is positioned to be contacted in the third position of hub 222 by a lug 239 pivoted on the outer face of flange 230 at 240. Lug 239 is yieldingly held in operating position with the end thereof resting upon the shaft 206 by means of a compression spring 241 disposed between the lug 239 and a projection 242 extending inwardly from the outer margin of flange 230.

A similar lifting device is disposed on the opposite end of rockshaft 206. Corresponding parts have been given the same reference numerals with the prime designation added. Shifting fork 224' is connected to the opposite end of rod 225. Consequently, lifting arms 221 and 221' can be moved in either direction by shifting the rod 225.

In order to prevent lifting arm 221 from rocking back beyond a full lowered position, a stop lug 250 is provided on hub 222, which is adapted to be contacted by a stop 251 provided on a laterally extending arm 252 fixed to the standard 253 bolted to the rear axle housing of the tractor. A similar stop 250' is provided for lifting arm 221', such lug cooperating with a stop 251' provided on laterally extending arm 252' fixed to a standard 253' bolted to the rear of this housing on the opposite side of the tractor.

As in the previously described embodiment, the operation of the power lift unit is controlled through the agency of a shifting lever 30' pivotally mounted at 31' upon a collar 32' fixed to the extended end of the valve control rockshaft 125', and the movements thereof are similarly restricted by a guide plate 40' provided with longitudinally extending slots 41', 42' and 43' connected at their rear by a transversely disposed slot 44'. Sliding movements of rod 225 are effected by a link connection 33' with lever 30'. The arrangement and relative positions of slots 41', 42' and 43' and lugs 235 and 236, lug 238 and pivoted dog 239, lugs 235' and 236', lug 238' and pivoted dog 239' is such that when lever 30' is disposed in slot 41', in the position shown in Figs. 4 and 5, lug 235 extends over the path of lug 236, lug 238 is outside the path of pivoted dog 239, lug 238' extends over the path of pivoted dog 239', and lug 235' extends outside the path of lug 236'. When lever 30' is disposed in the center slot 42', arms 221 and 221' are shifted laterally on rockshaft 206 into a position in which lug 238' no longer extends into the path of pivoted dog 239', lug 235' extends into the path of 236', and lug 235 still extends into the path of lug 236. When lever 30' is shifted into slot 43', arms 221 and 221' are shifted into a third position in which lug 235 is outside the path of lug 236, lug 238 is disposed within the path of pivoted dog 239, lug 235' has been shifted further into the path of lug 236' and lug 238 has been shifted still farther outside the path of pivoted dog 239'.

In the operation of the mechanism thus far described, the two lifting arms 221 and 221' may be operated to a raised position successively, with either arm being operated first, in the following manner; starting with the mechanism in the position shown in Figs. 4, 5 and 7, in which both lifting arms are in their lowered position with lugs 250 and 250' in contact with stops 251 and 251', and with the power lift unit in the position shown in Fig. 7, rockshaft 206 is in its clockwisemost position and sleeve member 202 is in its counter-clockwisemost position. Assuming that the lifting arm 221 is to be operated first and thereafter lifting arm 221', lever 30' is positioned in slot 41'. Lug 235 on arm 221 is just above lug 236 ready to be engaged thereby at the first movement of rockshaft 206 and to have lifting movement transmitted thereto. Lug 238' is in the path of pivoted dog 239', but the latter is above lug 238' as is shown in Fig. 6. When lever 30' is moved into the forward end of slot 41', it causes the piston rod 103' to be moved rearwardly, which causes the rockshaft 206 to be rotated in a counterclockwise direction and sleeve member 202 to be rotated in a clockwise position. Since sleeve member 202 is rocked in a clockwise direction, pivoted dog 239' merely rides over the top of and below lug 238', spring 241' accommodating the movement. The top of lug 238' is bevelled toward the rockshaft 206, as shown in Fig. 6, to facilitate this operation. During this time, arm 221' remains at rest, with lug 250' resting against stop 251'. After the piston rod 103' has been moved forwardly to the end of its stroke, the operator shifts the lever 30' to the rear end of slot 41'. This causes the piston rod 103' to be moved in the opposite direction, causing a clockwise rotation of rockshaft 206 and a counter-clockwise rotation of sleeve member 202. Pivoted dog 239' now engages lug 238', causing arm 221' to be rotated to a lifted position. Thus, on the rearward movement of piston rod 103', arm 221 is rocked to a raised position and on the return movement of piston rod 103', arm 221' is rocked to raised position.

In order to obtain a successive operation of the lifting arms 221 and 221' in reverse order, the operator moves the lever 30' into slot 43'. With the lever in this position, movement thereof into the forward end of slot 43' first causes a rocking movement of arm 221' to a lifted position through the engagement of lug 236' with lug 235', and when lever 30' is moved to the rear end of slot 43', lifting arm 221 is rocked to a raised position by virtue of the engagement of pivoted dog 239 with lug 238.

When the lever 30' is disposed in the center slot 42' and is moved to the forward end thereof, both lifting arms 221 and 221' are rocked simultaneously to a lifted position because lugs 235 and 235' are both in the path of lugs 236 and 236', respectively.

To hold each lifting arm 221 and 221' in a lifted position after it has been raised to such position by rockshaft 206, or sleeve member 202, a separate lockup device is provided for each lifting arm. The lockup device 260 for lifting arm 221 comprises a latch arm 261 fixed on the upper end of standard 253. Latch arm 251 is normally yieldingly held in the position shown in Figs. 4 and 6 by means of a compression spring 265 embracing a guide rod 266 fixed to the under side of latch arm 261. Spring 265 bears against the under side of latch arm 261 and the top side of seat 267 extending laterally from the upper end of standard 253. The guide rod 266 is curved about a stud 262 as a center and extends through a perforation in seat 267. Lifting arm 221 is provided with a latch hook 270 in a position to ride over and engage in back of a latch 271 on arm 261 just prior to the lifting arm 221 being raised to its full raised position responsive to the movement of lever 30' in slot 41'. Latch arm 261 is provided with a second latch 272 positioned to engage latch 270 on arm 221 when the latter is raised to a full raised position responsive to a forward movement of lever 30' in slot 43'. Lockup device 260' for arm 221' is similar to lockup device 260 and the corresponding parts have been given the same reference numbers with the prime designation added, latch 270' cooperating with latches 271' and 272' in the same manner. Thus, when either lifting arm 221 or 221' is raised to a full raised position, it is locked in such position by its lockup device 260 or 260', independently of the position of the rockshaft 206 or sleeve member 202.

In order that the operator may release either lifting arm 221 or 221' at will, each release device has been provided with a foot-operated release pedal, release pedal 275 being fixed on the inner end of stud 262, and release pedal 275' being fixed on the inner end of stud 262'. Pressing pedal 275 will release arm 221 and pressing pedal 275' will release arm 221', the arms then being free to move to a lowered position under the weight of the implement attached to it.

When the lifting arms are operated successively with arm 221 being operated last, the lifting movement is transmitted thereto by the engagement of pivoted dog 239 with lug 238. In order that this arm may be thereafter lowered at will, dog 239 is provided with a rearwardly extending lever arm 280, which contacts a lug 281 extending laterally from sleeve 202 just after latch 270 rides over latch 272, the last portion of the movement of sleeve member 203 causing a rotation of pivoted dog 239 out of engagement with and out of the path of lug 238. Thereafter arm 221 is held up wholly by the lockup device 260, and can be dropped to lowered position by pressing pedal 275. Pivoted dog 239' is provided with a similar lever arm which cooperates with a similar lug 281' to cause disengagement of dog 238' from lug 238' whenever arm 221' is rocked to lifted position through engagement therewith.

As previously described, when lever 30' is moved to the forward end of the center slot 42', both lifting arms 221 and 221' are raised simultaneously, these arms then being in their central position. In order that the operator may be able to lower both arms simultaneously without having to actuate the separate release pedals 275 and 275', the latches 271 and 272 have been spaced apart to provide the space 290 therebetween to receive the latch 270; and, similarly, latches 271' and 272' have been spaced to leave the space 290' to receive the latch 270' of arm 221' when the latter are in their central position. Thus, the arms are not locked up by the lockup devices 260 and 261 when they are both lifted at the same time. Instead, they are locked up merely by the oil trapped in the cylinder 101', with the piston 102' in its forward position. Moving the lever 30' to the rear end of slot 42' causes a return movement of the piston and a rocking of rockshaft 206 back to its clockwisemost position. Both arms 221 and 221' will thereupon fall back to their lowered position under the weight of the implements attached to them.

In order that the operator may be able to operate one lifting arm to raised position and thereafter release it to lowered position, while the other lifting arm is retained in a lowered position, arms 289 and 280' are provided with a foot pedal 295 and 295', respectively. Assuming, for example, that with both arms 221 and 221' in a lowered position, the operator wishes to raise arm 221' and shortly thereafter lower it again without disturbing arm 221, he shifts lever 30' into the forward end of slot 43'. This rotates arm 221' to lifted position through the counter-clockwise rotation of rockshaft 206 and the engagement of lug 235' with lug 236'. Latch 272' engages latch 270' to lock the arm in raised position. During this operation, pivoted lug 239 rides over lug 238 and in position to engage the latter. To be able to release arm 221' to a lowered position, it is of course necessary to first bring rockshaft 206 back to its clockwisemost position, by moving lever 30' to the rear end of slot 43'. Such movement also causes a counter-clockwise rotation of sleeve member 202 and lug 239 thereon. Therefore, in order to prevent the latter from transmitting lifting movement to arm 221, the operator at the same time that he moves lever 30' to the rear end of slot 43' also steps on pedal 295 to lift and hold lug 239 out of engagement with lug 238 until it has been rotated to a position where it rides over the top of lug 238.

We claim:

1. Power lift mechanism comprising a power unit, a control member therefor having two movements, means responsive to one of the movements of said control member for controlling the starting and stopping of said power unit, an actuating member normally disconnected from said power unit, a clutch for disengageably connecting said actuating member to said power unit and means resposive to another movement of said control member for engaging and disengaging said clutch.

2. Power left mechanism comprising a power unit, a control member therefor having movement in two directions, means responsive to the movement of said control member in one direction for controlling the starting and stopping of said power unit, an actuating member, a clutch for disengageably coupling said power unit to said actuating member for driving the latter and means responsive to the movement of said control member in the other direction for engaging and disengaging said clutch.

3. Power lift mechanism comprising a power unit, a control member therefor movable into either of two positions in either of two locations, means responsive to the movement of said control member to one position in either location for causing the operation of said power unit in one direction, and responsive to the movement of said control member to the other position in either location for causing the operation of said power unit in the other direction, a pair of actuating members and means responsive to the movement of said control member into one location for connecting one of said actuating members to said power unit and responsive to the movement of said control member into the other location for connecting the other of said actuating members to said power unit.

4. Power lift mechanism comprising a power unit, a control member therefor movable from a neutral to an operating position in either of two locations, a pair of movable members and means responsive to the movement of said control member into one location for connecting one of said movable members to said power unit to be actuated by the latter responsive to movement of the control member into said operating position in said one location, and responsive to the movement of said control member into the other location for connecting the other movable member to said power unit to be actuated by the latter responsive to movement of the control member into said operating position in the other of said locations.

5. Power lift mechanism comprising a power unit, a control member therefor movable into from a neutral to an operating position in either of two locations, a pair of movable members and means responsive to the movement of said control member into one location for connecting one of said movable members to said power unit to be actuated by the latter responsive to movement of the control member into said operating position in said one location, and responsive to the movement of said control member into the other location for connecting both movable members to said power unit to be actuated by the latter responsive to movement of the control member into said operating position in the other of said locations.

6. Power lift mechanism comprising a power unit, a control member therefor movable from a neutral to an operating position in either of two locations, a pair of movable members and means responsive to the movement of said control member into one location for connecting one of said movable members to said power unit to be actuated by the latter responsive to movement of the control member into said operating position in said one location, and responsive to the movement of said control member into the other location for connecting the other movable member to said power unit to be actuated by the latter responsive to movement of the control member into said operating position in the other of said locations, and a lockup device for the first of said movable members to hold the latter in actuated position independently of said power unit.

7. Power lift mechanism comprising a power unit, a control member therefor movable from a neutral to an operating position in either of two locations, a pair of movable members and means responsive to the movement of said control member into one location for connecting one of said movable members to said power unit to be actuated by the latter responsive to movement of the control member into said operating position in said one location, and responsive to the movement of said control member into the other location for connecting both movable members to said power unit to be actuated by the latter responsive to movement of the control member into said operating position in the other of said locations, and a lock up device for the first of said movable members to hold the latter in actuated position independently of said power unit, and means for disabling said lock up device responsive to movement of the control member into said other location.

8. Power lift mechanism comprising a power unit, a control member movable into either of two positions in either of three locations, means responsive to the movement of said control member to one position in each location for causing the operation of said power unit in one direction, and responsive to the movement of said control member to the other position in either location for causing the operation of said power unit in the other direction, a pair of movable members and means responsive to the movement of said control member into one location for connecting one of said movable members to said power unit, into another location for connecting the other of said movable members to said power unit, and into the third location for connecting both of said movable members to said power unit, whereby said movable members may be moved simultaneously or successively and either movable member moved first.

9. The invention defined by claim 3, further characterised by the inclusion of a separately operable lock up device for each movable member for releasably locking the latter in adjusted position.

10. The invention defined by claim 8 further characterized by the inclusion of a separably operable lock up device for each movable member for releasably locking the latter in adjusted position, and of means responsive to the movement of the control member in its third location for disabling both lock up devices.

11. Power lift mechanism comprising a hydraulically operated cylinder, a piston slidable therein and a control valve for controlling the flow of fluid to the cylinder, a pair of movable members optionally connected to said piston, a control member having two sets of movements and connected to said control valve for controlling the latter responsive to one set of movements, and means responsive to the other set of movements of said control member for controlling the connection of said movable members to said piston.

12. In a mechanism of the class described, the combination of a sleeve oscillatively mounted, a rockshaft within said sleeve, one end thereof extending beyond one end of the sleeve, means for oscillating said rockshaft and said sleeve simultaneously in opposite directions, a projection on the extended end of said rockshaft, a second projection on the adjacent end of said sleeve, a power member journaled on the extended end of said rockshaft between said projections, and having projections on opposite sides thereof, and means for moving said power member axially to dispose its projection on one side into the path of said first projection or its projection on the other side into the path of said second projection, whereby said power member may be actuated either by said rockshaft or said sleeve.

13. The combination of claim 12 in which said second projection on the sleeve is movably mounted, with the addition of means for moving said second projection out of the path of the companion projection on the power member.

14. The combination of claim 12 in which said second projection on the sleeve is movably mounted, with the addition of means for moving said second projection out of the path of the companion projection on the power member responsive to the power member being moved to a certain position.

15. The combination of claim 12 in which the other end of said rockshaft also extends beyond the other end of the sleeve, with the addition of a second similar power member journaled on such other end of said rockshaft, similar projections on such other end of the sleeve, rockshaft, and on said second power member, and means connecting said power members whereby when one power member is moved to be actuated by said rockshaft, the other power member is moved to be actuated by said sleeve.

16. In a mechanism of the class described, the combination of a pair of spaced power devices oscillatively mounted, means for oscillating said devices alternately in the same directions, a power member rockably mounted and shiftable into operative engagement with either of said devices to be actuated thereby, and a lock-up device for holding said power member in actuated position in either shifted position.

17. In a mechanism of the class described, the combination of a pair of spaced power devices oscillatively mounted, means for oscillating said devices alternately in the same directions, a power member rockably mounted and shiftable into operative engagement with either of said devices to be actuated thereby, and a lock-up device for holding said power member in actuated position in either shifted position, said power member being shiftable into a third position in which said lock-up device is ineffective, said power member including means for maintaining its operative engagement with one of said devices when in said third position.

18. Power lift mechanism comprising a rockshaft, a hydraulically operated cylinder and piston connected to rock the rockshaft, a pair of arms swingably mounted adjacent opposite ends of said rockshaft, respectively, a pair of clutch devices operative to selectively connect said arms to said rockshaft, a control member for controlling the flow of fluid to said cylinder, a handle mounted on said control member and movable relative to the latter, and means connecting said handle with said clutch devices for actuating the latter by movements of said handle relative to said control member.

19. Power lift mechanism comprising a rockshaft, a hydraulically operated cylinder and piston connected to rock the rockshaft, a pair of arms journaled on said rockshaft, a pair of clutch devices shiftable axially on said rockshaft to connect said arms to the latter, a swingably mounted control lever for controlling the flow of fluid to said cylinder, a handle swingably mounted on said lever and swingable in a plane generally perpendicular to the plane of movement of said lever, and means connecting said handle with said clutch devices for actuating the latter by movements of said handle relative to said control member.

20. Power lift mechanism comprising a rockshaft, a hydraulically operated cylinder and piston connected to rock the rockshaft, a pair of arms swingably mounted adjacent opposite ends of said rockshaft, respectively, a pair of clutch devices operative to selectively connect said arms to said rockshaft for movement by the latter in one direction only, a control member for controlling the flow of fluid to said cylinder, a handle mounted on said control member and movable relative to the latter, means connecting said handle with said clutch devices for actuating the latter selectively by movements of said handle relative to said control member, and a releasable lock up device associated with at least one of said arms for releasably holding the latter in adjusted position to permit the rockshaft to be rocked in the opposite direction independent thereof.

21. Power lift mechanism comprising a rockshaft, a hydraulically operated cylinder and piston connected to rock the rockshaft, a pair of arms swingably mounted adjacent opposite ends of said rockshaft, respectively, a pair of clutch devices operative to selectively connect said arms to said rockshaft for movement by the latter in one direction only, a control member for controlling the flow of fluid to said cylinder, a handle mounted on said control member and movable relative to the latter, means connecting said handle with said clutch devices for actuating the latter selectively by movements of said handle relative to said control member, and a pair of releasable lock up devices associated with said arms for holding the latter in adjusted position to permit the rockshaft to be rocked in the other direction independent thereof, said lock up devices having individual controls for separately releasing said arms at option.

22. Power lift mechanism comprising a rockshaft, a hydraulically operated cylinder and piston connected to rock the rock shaft, a pair of arms swingably mounted adjacent opposite ends of said rockshaft, respectively, a pair of clutch devices operative to selectively connect said arms to said rockshaft for movement by the latter in one direction only, a control member for controlling the flow of fluid to said cylinder, a handle mounted on said control member and movable relative to the latter, means connecting said handle with said clutch devices for actuating the latter selectively by movements of said handle relative to said control member, a pair of releasable lock up devices associated with said arms for holding the latter in adjusted position to permit the rockshaft to be rocked in the other direction independent thereof, said lock up devices having individual controls for separately releasing said arms at option, and means engageable by said control member in one position of the latter for releasing at least one of said lock up devices.

23. Power lift mechanism comprising a rockshaft, a hydraulically operated cylinder and piston connected to rock the rockshaft, a pair of arms journaled on said rockshaft and slidable axially thereon, means on said rockshaft engageable with each of said arms when the latter are shifted into certain positions, for driving said arms by said rockshaft, a control member for controlling the flow of fluid to said cylinder, a handle mounted on said control member and movable relative to the latter, and means connecting said handle with said arms for shifting the latter axially into engagement with said driving means by movements of said handle relative to said control member.

24. Power lift mechanism comprising a rockshaft, a hydraulically operated cylinder and piston connected to rock the rockshaft, a pair of arms journaled on said rockshaft and slidable axially thereon, means on said rockshaft engageable with each of said arms when the latter are shifted into certain positions, for driving said arms by said rockshaft, a control member for controlling the flow of fluid to said cylinder, a handle mounted on said control member and movable relative to the latter, means connecting said handle with said arms for shifting the latter axially into engagement with said driving means by movements of said handle relative to said control member, and a pair of releasable lock-up devices for holding said arms in rocked position to permit the rockshaft to be rocked in the other direction independent of said arms, said lock-up devices having individual controls for separately releasing said arms.

25. Power lift mechanism comprising a rockshaft, a hydraulically operated cylinder and piston connected to rock the rockshaft, a pair of arms journaled on said rockshaft and slidable axially thereon, means on said rockshaft engageable with each of said arms when the latter are shifted into certain positions, for driving said arms by said rockshaft, a control member for controlling the flow of fluid to said cylinder, a handle mounted on said control member and movable relative to the latter, and means connecting said handle with said arms for shifting the latter axially into a first position in which one arm only is connected to said rockshaft to be rocked thereby, into a second position in which only the other arm is connected to the rockshaft to be rocked thereby, and into a third position in which both arms are connected to the rockshaft to be rocked thereby.

26. Power lift mechanism comprising a rockshaft, a hydraulically operated cylinder and piston connected to rock the rockshaft, a pair of arms journaled on said rockshaft and slidable axially thereon, means on said rockshaft engageable with each of said arms when the latter are shifted into certain positions, for driving said arms by said rockshaft, a control member for controlling the flow of fluid to said cylinder, a handle mounted on said control member and movable relative to the latter, means connecting said handle with said arms for shifting the latter axially into a first position in which one arm only is connected to said rockshaft to be rocked thereby, into a second position in which only the other arm is connected to the rockshaft to be rocked thereby, and into a third position in which both arms are connected to the rockshaft to be rocked thereby, and a pair of releasable lock up devices engageable with each of said arms when the latter are rocked from said first or second positions but are out of engagement with said arms when the latter are rocked from said third position.

27. Power lift mechanism comprising a rockshaft, a sleeve embracing said rockshaft, a hydraulically operated cylinder and piston connected to rock said rockshaft and sleeve simultaneously in relatively opposite directions, a pair of arms swingably mounted adjacent opposite ends of said rockshaft, respectively, and shiftable axially thereof into and out of engagement with driving means on said rockshaft, an interrelated pawl and stop means on said sleeve and arm at each end of said sleeve, each interrelated pawl and stop being interengageable by shifting the associated arm axially and out of engagement with said driving means, said driving means and said pawl and stop means being adapted to rock said arms upon successive strokes of said piston in said cylinder, a control member for controlling the flow of fluid to said cylinder, a handle mounted on said control member and movable relative to the latter, and means connecting said handle with said arms for shifting the latter from positions engaging said driving means and said pawl and stop means by movements of said handle relative to said control member.

28. The combination set forth in claim 27, with the further provision that the connections between said arms and said rockshaft and sleeve are so arranged that when one of said arms is connected to said rockshaft through said driving means, the other of said arms can be connected to said sleeve through the associated pawl and stop means, and vice versa.

29. The combination set forth in claim 27, with the further provision that the connections between said arms and said rockshaft and sleeve are so arranged that when one of said arms is connected to said rockshaft through said driving means, the other of said arms can be connected to said sleeve through the associated pawl and stop means, and vice versa, and said arms can also be shifted to a position in which both arms can be rocked through said rockshaft driving connection, simultaneously.

30. Power lift mechanism comprising a rockshaft, a hydraulically operated cylinder and piston connected to rock said rockshaft, a pair of arms swingably mounted adjacent opposite ends of said rockshaft, respectively, a pair of clutch devices operative to selectively connect said arms to said rockshaft, a control member for controlling the flow of fluid to said cylinder, a handle mounted on said control member and movable relative to the latter, and means responsive to different movements of said handle for effecting the engagement of said clutches, selectively.

THEOPHILUS BROWN.
TALBERT W. PAUL.